United States Patent [19]

Murakawa et al.

[11] Patent Number: 5,029,668
[45] Date of Patent: Jul. 9, 1991

[54] MUFFLER SYSTEM

[75] Inventors: Masatake Murakawa; Nobuyuki Yamashita; Ryozo Imanishi; Yoji Fujihara, all of Osaka, Japan

[73] Assignee: Kubota Ltd., Osaka, Japan

[21] Appl. No.: 412,926

[22] Filed: Sep. 26, 1989

[30] Foreign Application Priority Data

Oct. 6, 1988 [JP] Japan ............................ 63-131249[U]
Oct. 6, 1988 [JP] Japan ................................ 63-252368

[51] Int. Cl.⁵ .............................................. F01N 7/10
[52] U.S. Cl. ...................................... 181/240; 181/282
[58] Field of Search ............... 181/204, 262, 282, 283, 181/240, 264; 123/41, 56, 62; 180/68.1, 68.3, 89.2, 900, 309; 60/320, 321; 56/255

[56] References Cited

U.S. PATENT DOCUMENTS

| | | | |
|---|---|---|---|
| 2,658,580 | 11/1953 | Trembley | 181/283 |
| 3,795,287 | 3/1974 | Rose | 181/283 |
| 3,987,766 | 10/1976 | Welck | 123/41.66 |
| 4,265,332 | 5/1981 | Presnall et al. | 181/283 X |
| 4,471,853 | 9/1984 | Callaghan et al. | 181/262 X |
| 4,741,411 | 5/1988 | Stricker | 181/283 |
| 4,766,983 | 8/1988 | Tamba et al. | 181/240 |

Primary Examiner—Brian W. Brown
Attorney, Agent, or Firm—Webb, Burden, Ziesenheim & Webb

[57] ABSTRACT

A muffler system for a working vehicle, particularly a lawn mower, comprising a main muffler body connected to an exhaust manifold of the engine, and a curved muffler cover covering the main muffler body from below. An exhaust pipe extends from the main muffler body laterally outwardly of the vehicle body, and defines an exhaust outlet for discharging exhaust gas in a direction away from a front wheel and the ground. Cooling air is blown by a cooling fan from the engine into the muffler cover. The muffler cover defines air exhaust openings for directing the cooling air forwardly of the vehicle body.

9 Claims, 4 Drawing Sheets

MUFFLER SYSTEM

BACKGROUND OF THE INVENTION

1. Field of the Invention

The present invention relates to a muffler system for a working vehicle, particularly a lawn mower, having a main muffler body connected to an exhaust manifold of an engine and disposed forwardly and downwardly of the vehicle body. Such a muffler system includes a muffler cover covering the main muffler body from below, and cooling air flows from the engine through the muffler cover.

2. Description of the Prior Art

In a known muffler system of a lawn mower as noted above, an exhaust pipe opens laterally of the vehicle body, and the muffler cover covers only the bottom face of the main muffler body. The muffler cover defines a plurality of large exhaust openings for letting out cooling air flowing from the engine to the main muffler body.

According to the known construction, part of hot exhaust gas flowing out of the exhaust pipe of the muffler system could strike a front wheel to be directed to the ground. In addition, the cooling air flowing from the engine and heated by the main muffler body tends to proceed to the ground through a space between the main muffler body and the muffler cover laterally of the main muffler body.

The lawn mower may be kept standing still for a long time with the engine idling during a grass cutting operation. On such an occasion the lawn below the main muffler body may die from the heat of the exhaust gas and cooling air blowing to the ground.

SUMMARY OF THE INVENTION

An object of the present invention is to provide an improved muffler system for eliminating the inconvenience noted above.

Another object of the present invention is to provide a muffler system having increased rigidity.

The above objects are achieved, according to the present invention, by a muffler system comprising a main muffler body connected to an exhaust manifold of the engine disposed in a front region of a vehicle body; an exhaust extension pipe extending from the main muffler body laterally outwardly of the vehicle body, the exhaust extension pipe including an exhaust outlet for directing exhaust gas away from the wheels and the ground; and a muffler cover for covering the main muffler body from below, the muffler cover receiving cooling air blown thereinto by a cooling fan of the engine, and defining air exhaust openings for directing the cooling air substantially forwardly of the vehicle body.

With this construction, there is no possibility of hot exhaust gas from the main muffler body and heated cooling air being directed to the ground.

Thus, the present invention eliminates the inconvenience of the lawn dying below the main muffler body when the mower is kept standing still for a long time with the engine idling while cooling the muffler body with the engine cooling air. Even if the forwardly discharged cooling air is dispersed downwardly to the ground, its temperature will be cool enough by the time it reaches the ground to produce no detrimental effect on the lawn.

In a preferred embodiment of the invention, the muffler cover includes a frame secured to a forward end of the vehicle body to act as a bumper and defining a vertical opening region, the frame including a right and left pair of lateral portions extending forwardly from the forward end and a front portion continuous with the lateral portions; a curved cover plate extending between the forward end of the vehicle body and the front portion of the frame for covering, as spaced from, a lower face of the main muffler body disposed in the opening region; and left and right side plates attached to opposite lateral ends of the curved cover plate. The curved cover plate includes bores in a forwardly facing portion thereof acting as the air exhaust openings.

In the above construction, the muffler cover, which has a sheet metal construction, extends between the front portion of the frame acting as the bumper and the forward end of the vehicle frame, thereby reinforcing the bumper per se in the fore and aft direction.

In other words, the muffler cover having a sheet metal construction for covering the main muffler body from front, back, right, left and bottom has itself a greater rigidity, particularly in the fore and aft direction, than the conventional muffler cover. This muffler cover with increased rigidity interconnects the bumper and the vehicle frame, thereby to increase the rigidity of the bumper in the fore and aft direction. The muffler cover serving this purpose is realized only by devising the shape, rigidity and attachment of an existing muffler cover. It is, therefore, totally unnecessary to make extensive modifications to components other than the muffler cover or to add new components.

The foregoing and other objects, features and advantages of the invention will be apparent from the following more particular description of a preferred embodiment of the invention, as illustrated in the accompanying drawings.

BRIEF DESCRIPTION OF THE DRAWINGS

The drawings show a muffler system for a working vehicle according to the present invention, in which.

DESCRIPTION OF THE PREFERRED EMBODIMENT

An embodiment of the present invention will be described hereinafter with reference to the drawings, as applied to a riding type lawn mower which is one example of working vehicles.

Figure 1:
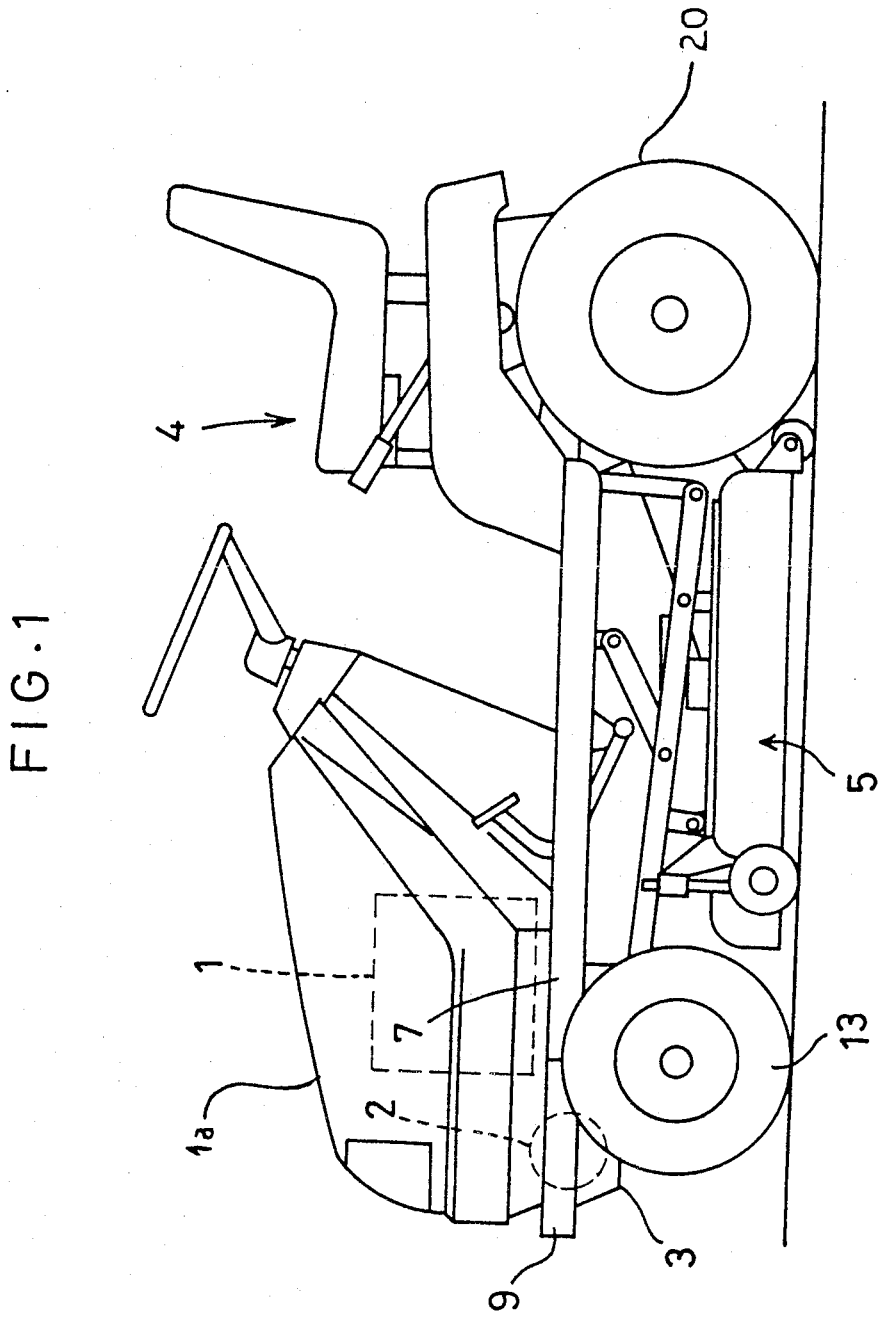
FIG. 1 is a side elevation of a lawn mower.

As shown in FIG. 1, the lawn mower comprises a front wheel 13 and a rear wheel 20, an engine 1 disposed at a front position or a forward end region of a vehicle body or mower body 1a, a main muffler body 2 and a muffler cover 3 both disposed forwardly and downwardly of the vehicle body, a driver's seat 4 mounted on a rear position, and a grass cutting unit 5 suspended from and disposed below the vehicle body below 1a.

Figure 2:
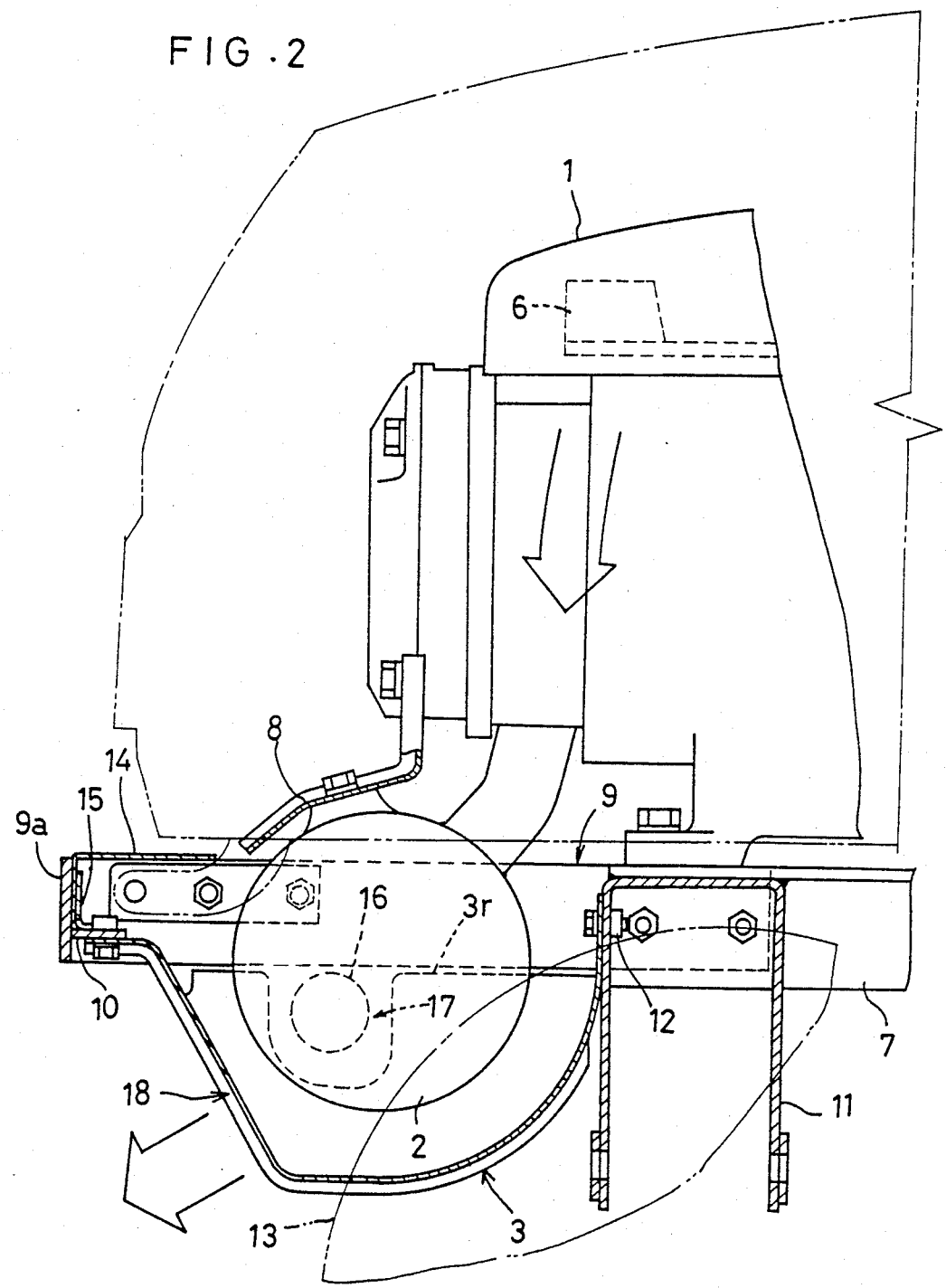
FIG. 2 is a side view of the muffler system.

Referring to FIG. 2, the engine 1 is an air-cooled engine with an output shaft extending vertically, and a cooling fan 6 is disposed at a top position thereof for directing cooling air downwardly to cool the engine. The cooling air after cooling the engine 1 flows into the muffler cover 3.

The main muffler body 2 has a cylindrical shape and is attached to a bracket 8 disposed forwardly of the engine 1 mounted on a vehicle frame 7. The vehicle frame 7 carries a bumper 9 connected to a forward end thereof. The bumper 9 has a gate-shaped configuration in plan view, surrounding the muffler body 2.

Figure 3:
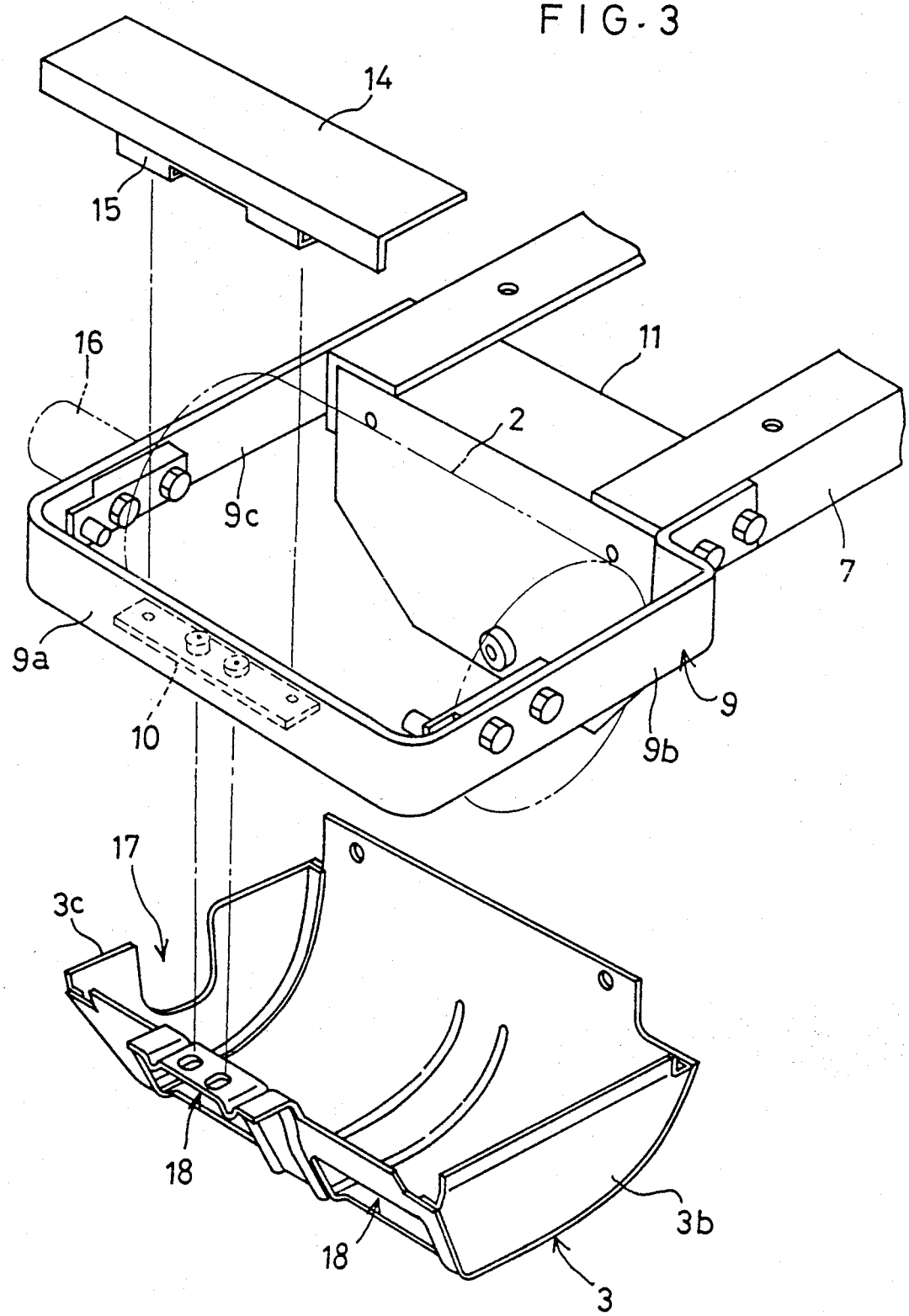
FIG. 3 is an exploded perspective view showing how a muffler cover is attached.

As seen from FIG. 3, the bumper 9 comprises a frame attached to the forward end of the vehicle frame 7 and defining a vertically opening region. This bumper frame includes a pair of right and left lateral portions 9b and 9c extending forwardly from the forward end of the vehicle frame 7, and a front portion 9a continuous with the lateral portions 9b and 9c.

A front support plate 10 is welded in a horizontal posture to an inward face of the front portion 9a of the bumper 9. A front axle bearing 11 is attached to the forward end of the vehicle frame 7, the bearing 11 defining bores in a front wall thereof, and nuts 12 are welded to positions of a rear face of the front wall where the bores are formed. The muffler cover 3 is bolted at opposite ends thereof to the front support plate 10 and to the nuts 12. The muffler cover 3 is curved to cover a lower face of the muffler body 2 with an appropriate spacing therebetween.

Further, an angled cover 14 is bolted to the front support plate 10 through a flange metal piece 15. The angled cover 14 extends substantially from end to end along the inward face of the front portion 9a of the bumper 9.

Figure 4:
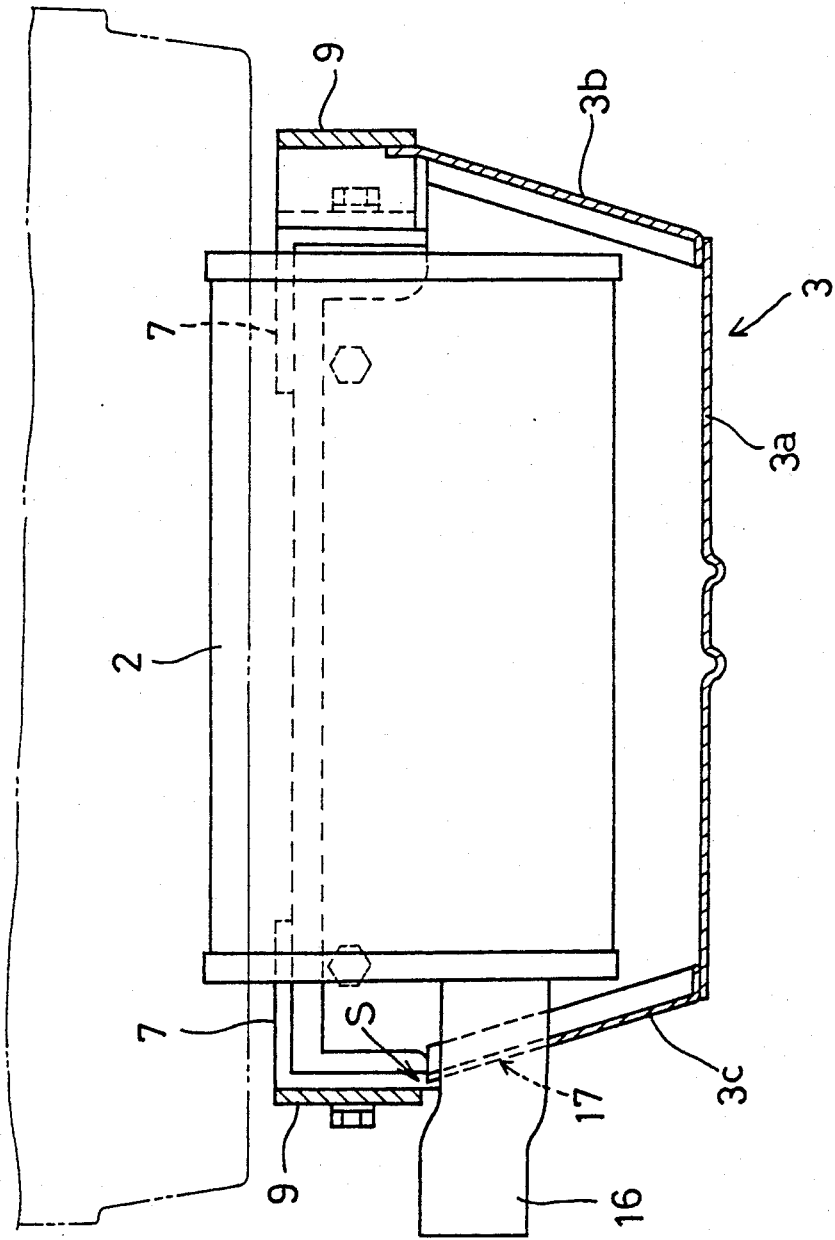
FIG. 4 is sectional front view of the muffler system.

As shown in FIGS. 3 and 4, the muffler cover 3 has a continuous sheet metal construction including a curved cover plate 3a and left and right side plates 3b and 3c attached to opposite lateral ends of the curved plate 3a. Thus, the muffler cover 3 covers the muffler body 2 from front, back, right, left and bottom. The right side plate 3c defines an opening 17 through which an exhaust pipe 16 extends laterally from the muffler body 2 to a position offset from the front wheel 13 in side view. The muffler cover 3 defines air exhaust openings 18 in forward positions thereof for discharging the cooling air only forwardly.

The left side plate 3b of the muffler cover 3 extends on and along an inward face of the left lateral portion 9b of the bumper 9. The right side plate 3c has a top edge extending slightly inwardly and downwardly along the right lateral portion 9c of the bumper 9, to define a space S for absorbing a manufacturing error.

What is claimed is:

1. A comprising:
   a front wheel and a rear wheel;
   a cutting unit disposed below a mower body between said front wheel and said rear wheel;
   an engine disposed in a forward end region of said mower body and carrying a cooling fan in a top position thereof for producing a downward cooling air flow to cool said engine;
   a main muffler body connected to an exhaust manifold of said engine;
   an exhaust extension pipe extending from said main muffler body laterally outwardly of said mower body, said exhaust extension pipe including an exhaust outlet for directing exhaust gas away from said front wheel, said rear wheel and the ground; and
   muffler cover means for covering said main muffler body from below, said muffler cover means receiving the cooling air blown thereinto by said cooling fan of said engine, said muffler cover means having air exhaust openings defined therein for directing the cooling air substantially forwardly of said mower body.

2. A lawn mower as claimed in claim 1, wherein said muffler cover means includes;
   a frame secured to a forward end of the mower body to act as a bumper and defining a vertical opening region, said frame including a right and left pair of lateral portions extending forwardly from said forward end and a front portion continuous with said lateral portions,
   a curved cover plate extending between said forward end of the vehicle body and said front portion of said frame for covering, as spaced from, a lower face of said main muffler body disposed in said opening region, and
   left and right side plates attached to opposite lateral ends of said curved cover plate,
   said curved cover plate including bores in a forwardly facing portion thereof acting as said air exhaust openings.

3. A lawn mower in claim 1, wherein said engine is disposed vertically in the forward end region of said mower body, and said muffler cover means is disposed at a forward end of said mower body, said muffler cover means further includes:
   a bumper for supporting said muffler cover means; and
   a downwardly curved surface for receiving the cooling air flowing downwardly and a front wall wherein said main muffler body mounts in a space defined by said curved surface and said air exhaust openings are defined in said front wall of said muffler cover means, and wherein said exhaust extension pipe extends transversely of the mower body from said main muffler body and defines an exhaust outlet opening laterally of the vehicle body.

4. A lawn mower as claimed in claim 3 wherein said bumper has a frame construction disposed at the forward end of the mower body, said muffler cover means being fitted in said bumper.

5. A lawn mower as claimed in claim 3, wherein said muffler cover means defines an opening for receiving said exhaust extension pipe.

6. A lawn mower comprising:
   a front wheel and a rear wheel;
   a mower body mounted to said front wheel and said rear wheel;
   a cutting unit disposed below said mower body between said front wheel and said rear wheel;
   an engine disposed vertically in a forward region of said mower body;
   a cooling fan disposed at an upper end of said engine for directing cooling air downwardly;
   a muffler cover disposed at a forward end of said mower body and including a downwardly curved surface for receiving the cooling air flowing downwardly;
   air exhaust openings defined in a front wall of said muffler cover;
   a main muffler body mounted in a space defined by said curved surface;
   an exhaust extension pipe extending transversely of said mower body from said main muffler body and defining an exhaust outlet opening laterally of said mower body; and
   a bumper for supporting said muffler cover.

7. A lawn mower as claimed in claim 6, wherein said bumper has a frame construction disposed at the forward end of said mower body, said muffler cover being fitted in said bumper.

8. A lawn mower as claimed in claim 6, wherein said muffler cover defines an opening for receiving said exhaust extension pipe.

9. A muffler system for a working vehicle having a front wheel and a rear wheel, a vehicle body mounted to said front wheel and said rear wheel, and an engine disposed in said vehicle body and carrying a cooling fan, said muffler system comprising:
- a main muffler body connected to an exhaust manifold of said engine in a front region of said vehicle body;
- an exhaust extension pipe extending from said main muffler body laterally outwardly of said vehicle body, said exhaust extension pipe including an exhaust outlet for directing exhaust gas away from said front wheel, said rear wheel and the ground; and
- muffler cover means for covering said main muffler body from below, said muffler cover means receiving the cooling air blown thereinto by said cooling fan of said engine, said muffler cover means having air exhaust openings defined therein for directing the cooling air substantially forwardly of said vehicle body, wherein said muffler cover means includes:
- a frame secured to a forward end of said vehicle body to act as a bumper and defining a vertical opening region, said frame including a right and left pair of lateral portions extending forwardly from said forward end and a front portion continuous with said lateral portions,
- a curved cover plate extending between said forward end of said vehicle body and said front portion of said frame for covering, as spaced from, a lower face of said main muffler body disposed in said opening region, and
- left and right side plates attached to opposite lateral ends of said curved cover plate, said curved plate including bores in a forwardly facing portion thereof acting as said air exhaust openings.

* * * * *

UNITED STATES PATENT AND TRADEMARK OFFICE
CERTIFICATE OF CORRECTION

PATENT NO. : 5,029,668

DATED : July 9, 1991

INVENTOR(S) : Masatake Murakawa, Nobuyuki Yamashita, Ryozo Imanishi and Yoji Fujihara It is certified that error appears in the above-identified patent and that said Letters Patent is hereby corrected as shown below:

Column 2 Line 62 after "body" delete --below--.

Claim 1 Line 49 Column 3 after "A" insert --lawn mower--.

Claim 4 Line 39 Column 4 after "3" insert --,--.

Signed and Sealed this

Ninth Day of March, 1993

*Attest:*

STEPHEN G. KUNIN

*Attesting Officer*   *Acting Commissioner of Patents and Trademarks*